(12) United States Patent
Socher et al.

(10) Patent No.: US 12,468,586 B2
(45) Date of Patent: Nov. 11, 2025

(54) NETWORK AWARE API FOR DISTRIBUTED DATA PROCESSING

(71) Applicant: Eseye Limited, Guildford (GB)

(72) Inventors: Larry Socher, Vienna, VA (US); Jon Darley, Guildford (GB)

(73) Assignee: ESEYE LIMITED, Surrey (GB)

( * ) Notice: Subject to any disclaimer, the term of this patent is extended or adjusted under 35 U.S.C. 154(b) by 25 days.

(21) Appl. No.: 18/641,669

(22) Filed: Apr. 22, 2024

(65) Prior Publication Data

US 2025/0328399 A1 Oct. 23, 2025

(51) Int. Cl.
*G06F 9/54* (2006.01)
*H04L 41/0816* (2022.01)

(52) U.S. Cl.
CPC .......... *G06F 9/547* (2013.01); *H04L 41/0816* (2013.01)

(58) Field of Classification Search
CPC .............................. H04L 41/0816; G06F 9/547
See application file for complete search history.

(56) References Cited

U.S. PATENT DOCUMENTS

2009/0019141 A1* 1/2009 Bush ................... H04L 12/2807
715/734
2025/0080416 A1* 3/2025 Mitrache ................ H04L 41/16

* cited by examiner

*Primary Examiner* — Benjamin M Thieu
(74) *Attorney, Agent, or Firm* — Kilpatrick Townsend & Stockton LLP

(57) ABSTRACT

A mechanism for controlling a function performed by an application running on a processing system of an electronic device. The processing system is configured to host an application programming interface, API, that facilitates access to information about static and/or dynamic values of communication networks over which the electronic device is able to communicate. The application makes use of the available information through the API to control the function(s) performed by the application.

18 Claims, 2 Drawing Sheets

NETWORK AWARE API FOR DISTRIBUTED DATA PROCESSING

FIELD OF THE INVENTION

The present invention relates to the field of application programming interfaces.

STATEMENT REGARDING PRIOR DISCLOSURES OF JOINT INVENTOR

Certain aspects of the present application were previously made public by one or more of the joint inventors, or from subject matter obtained directly or indirectly from one or more of the joint inventors, within the 12 months preceding the effective filing date of the present application in the following references:
1. "The Rise of the Intelligent IoT Edge in 2024," Larry Socher, Jan. 18, 2024, online publication https://www.eseye.com/resources/news/the-rise-of-the-intelligent-iot-edge-in-2024/
2. "3 IoT Predictions for 2024 and Beyond," Larry Socher, Mar. 13, 2024, online publication https://www.eseye.com/resources/podcasts/3-iot-predictions-for-2024-and-beyond/

BACKGROUND OF THE INVENTION

There is an ongoing trend of connecting electronic devices over communication networks. One significant example is the Internet of Things (IoT). It is common for such devices to be able to communicate using a variety of different communication networks.

Typically, a device will independently decide over which communication network it will communicate. A device that is enabled with multiple network technologies ideally has the intelligence to select the optimal network based on its availability, signal strength, bandwidth, latency, security, cost and other attributes that are prioritized based the device, the application, and data transfer requirements. As a working example, a cellular-enabled device will typically be configured to prioritize communications over a communication network defined by the IEEE 802.11 family of standards and, if such a network is not available, to communicate over a cellular network (e.g., 3G, 4G, 5G, Non-Terrestrial Networks (NTNs) and so on). Similarly, such a cellular-enabled device will typically prioritize communications over more optimized technology types (e.g., prioritize a lower powered LPWAN over a standard 4G LTE network).

There is an ongoing desire to improve the flexibility of communication using communication networks.

BRIEF SUMMARY OF THE INVENTION

The invention is defined by the claims.

According to examples in accordance with an aspect of the invention, there is provided an electronic device comprising: a communication system configured to facilitate and optimize communication externally to the electronic device over a plurality of different communication networks; a memory configured to store, as static values, the value of one or more static properties for each of the plurality of different communication networks; and a processing system.

The processing system is configured to execute one or more applications configured to communicate using the communication system; host a network monitoring application configured to monitor, as dynamic values, the value of one or more dynamic properties for each of the plurality of different communication networks and host an application programming interface configured to respond to an API request, from a requesting one of the one or more applications, by providing one or more of the dynamic values and/or static values to the requesting application.

The requesting one of the one or more applications are each configured to adjust a function performed by the application responsive to the one or more of the dynamic values and/or static values.

The present disclosure thereby provides a mechanism for making network information available at the application layer. This allows an application running on the processing system to make intelligent and/or informed decisions about data transmission and/or requests over the network(s). This approach also permits any such application to decide or select an appropriate network over which to communicate with external devices. The proposed approaches can be exploited, for instance, to allow the application to decide which data to process locally (e.g., at the electronic device) and which data is to be sent externally for processing. The proposed approach also facilitates intelligent prioritization and/or buffering of data to be sent to any external device based on network conditions. An example would be to prioritize and send less data over a low-bandwidth and high-cost satellite network and send more data over low-cost home Wi-Fi and/or broadband network.

In the context of the present disclosure, a dynamic property is one whose changes in values can be measured, monitored or otherwise identified at the electronic device (i.e., independently of any other device). Similarly, a static property is one whose changes in values can only be determined or derived externally to the electronic device (e.g., in the form of a user input to the electronic device or determined or defined at an external device that communicates with the electronic device).

In some examples, the requesting one of the one or more applications may be configured to adjust a data transfer function performed by the application (using the communication network(s)) responsive to the one or more of the dynamic values and/or static values. The data transfer function may include a transfer of data from the electronic device to an external device or end server over the communication networks(s).

The processing system may be configured to, when hosting the application programming interface, communicate with an external device, using the communication system, to update the static values.

The one or more dynamic properties may include one or more of the following: an availability; a signal strength; a radio access technology; a bandwidth; an end-to-end throughput; a latency; and/or a power consumption.

The one or more static properties may include: a security level; a reliability; a level of compliance; and/or a network cost.

In some examples, application programming interface is configured to, responsive to a change in either a static or a dynamic value beyond a predetermined threshold, asynchronously provide an indicator of change to at least one of the one or more applications executed by the processing system. In this way, the application programming interface (API) may be able to push changes in the updated static or dynamic value(s) to the application(s) executed by the processing system. This allows or facilitates the application(s) to more quickly respond to changes in the static or dynamic values.

In some examples, at least one of the one or more applications executed by the processing system comprises any application that previously sent an API request to the application programming interface.

The processing system (of the electronic device) may be further configured to send, using the communication system, the dynamic values to one or more external devices.

The requesting application may be configured to select a communication network, over which to communicate using the communication system, responsive to the one or more dynamic values and/or static values provided by the application programming interface in response to the API request.

The requesting application may be configured to determine an amount of data to communicate using the communication system, responsive to the one or more dynamic values and/or static values provided by the application programming interface in response to the API request.

There is also proposed a method for using an electronic device, wherein the electronic device comprises; a memory; a processing system and a communication system configured to facilitate communication externally to the electronic device over a plurality of different communication networks.

The method comprises: storing, in the memory configured, as static values, the value of one or more static properties for each of the plurality of different communication networks; executing, on the processing system, one or more applications configured to communicate using the communication system; hosting, on the processing system, a network monitoring application configured to monitor, as dynamic values, the value of one or more dynamic properties for each of the plurality of different communication networks; and hosting, on the processing system, an application programming interface configured to respond to an API request, from a requesting one of the one or more applications, by providing one or more of the dynamic values and/or static values to the requesting application.

The method may further comprise, when hosting the application programming interface, communicating with an external device, using the communication system, to update the static values.

In some examples, the one or more dynamic properties include but are not limited to one or more of the following: an availability; a signal strength; a radio access technology; a network availability; a bandwidth; an end-to-end throughput; a latency; and/or a power consumption.

In some examples, the one or more static properties include but are not limited to: a security level; a reliability; a level of compliance; and/or a network cost.

In some examples, the requesting application is configured to determine an amount of data to communicate using the communication system, responsive to the one or more dynamic values and/or static values provided by the application programming interface in response to the API request.

In some examples, the application programming interface is configured to respond to the API request by providing one or more of the dynamic values and/or static values for two or more communication networks to the requesting application; and the requesting application is configured to select a communication network, over which to communicate using the communication system, responsive to the one or more dynamic values and/or static values provided by the application programming interface in response to the API request.

The method may be adapted to carry out the functions performed by any herein disclosed processing system and vice versa. Approaches for appropriately modifying a method to perform such functions will be readily apparent to the appropriately skilled person.

There is also proposed a computer-readable medium comprising instructions which, when executed by a processing system, causes the processing to perform any herein disclosed method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE INVENTION

Figure 1:
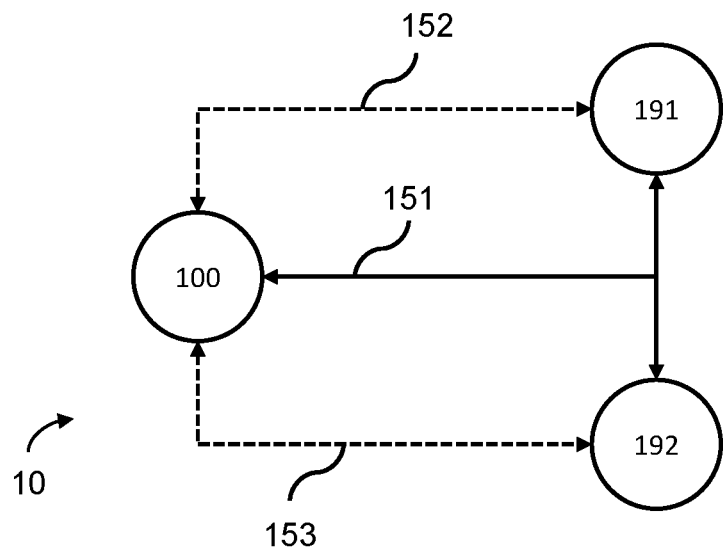
FIG. 1 illustrates an environment in which embodiments may be employed.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for controlling a function performed by an application running on a processing system of an electronic device. The processing system is configured to host an application programming interface, API, that facilitates access to information about static and/or dynamic values of communication networks over which the electronic device is able to communicate. The application makes use of the available information through the API to control the function(s) performed by the application.

Embodiments are based on the realization that it would be advantageous for an application running on a processing system to modify its functionality, particularly a data transfer functionality, based on network information. For instance, if a network has a reduced bandwidth, then it may be advantageous to reduce the amount of data that the application instructs to be sent over the network.

The present disclosure proposes an API that makes network information available at an application level, which is used by one or more applications to control or adjust its functionality, particularly a data transfer functionality.

FIG. 1 illustrates an environment 10 in which embodiments may be employed. The environment comprises an electronic device 100 and one or more external devices 191, 192, such as end servers or application servers.

The electronic device 100 is configured to be able to communicate with the external device(s) over a plurality of (different) communication networks or channels 151, 152, 153. Each communication network or channel can be associated with a different communication protocol and/or Radio Access Technology (RAT) type. Typically, at least one (e.g., each) communication network is a wireless network, e.g., configured to operate according to a particular wireless communication protocol.

Suitable examples of (wireless) communication protocols include an infrared link, ZigBee, Bluetooth, a wireless local area network protocol such as in accordance with the IEEE 802.11 (WiFi) standards, a cellular communication protocol (such as a 2G, 3G, 4G telecommunication protocol), a satellite or non-terrestrial network (NTN) protocol and so on. Other formats will be readily apparent to the person skilled in the art.

Figure 2:
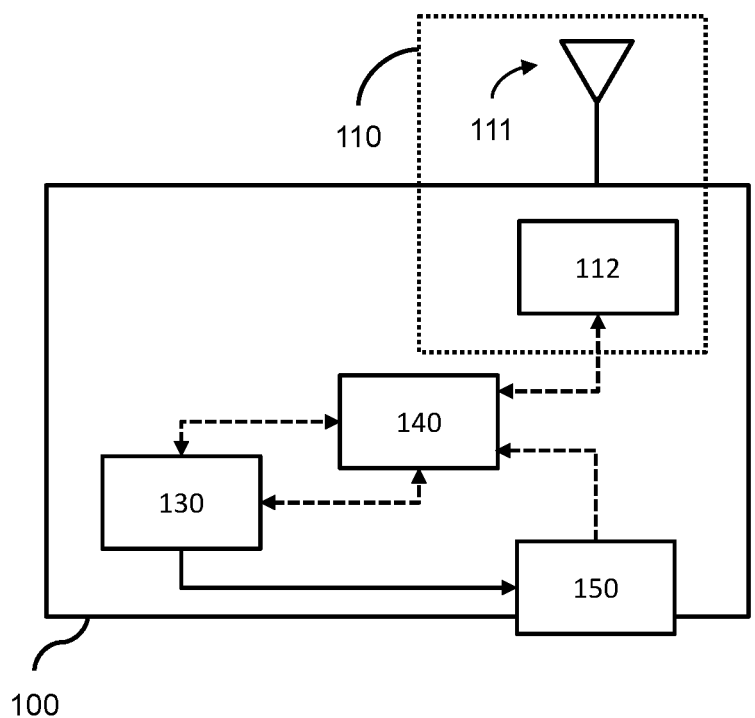
FIG. 2 illustrates a proposed electronic device.

FIG. 2 schematically illustrates an electronic device 100 according to an embodiment.

The electronic device 100 comprises a communication system 110, a memory 130 and a processing system 140.

The communication system 110 is configured to facilitate communication externally to the electronic device over a plurality of different communication networks. Suitable examples of communication networks have been previously provided.

By way of example, the communication system 110 may comprise at least one antenna 111 and communication processor 112, which is communicatively coupled to the at least one antenna 111. The communication processor 112 may be configured to control electrical signals provided to the at least one antenna 111 and process any electrical signal produced by the at least one antenna, i.e., operate as a transceiver. The antenna (e) 111 is configured to generate electromagnetic waves (e.g., wireless signals) responsive to received electrical signals and generate electrical signals responsive to received electromagnetic waves. The function and operation of such communication systems are well known in the art.

The memory 130 is configured to store, as static values, the value of one or more static properties for each of the plurality of different communication network. A static property is one whose changes in values can only be monitored, determined or derived externally to the electronic device (e.g., by a user/operator or defined by an external device). Thus, from the perspective of the electronic device, they are effectively "static" unless explicitly updated from an external source. Thus, alternative labels for the dynamic properties include "device-unmonitorable properties" or "non-measurable properties".

In some preferred examples, the one or more static properties includes at least one static property that is not a mere label or name of the corresponding communication network.

Suitable examples of static properties include: a security level; a reliability; a level of compliance; and/or a network cost. A security level may, for instance, indicate a impenetrability of a the communication network which may, for instance, change only if there is a security breach or the like. A reliability may be a long-term indicator of communication network reliability or trustworthiness, e.g., based on population statistics of any communication failures. A level of compliance may indicate a measure or indicator of compliance with any known standard, such as HIPAA, PCI, GDPR, a data sovereignty standard, or other standards and/or a measure of compliance with data sovereignty restrictions. A network cost may indicate, for instance, a financial cost and/or (preferably) a material resource cost such as a power cost or bandwidth cost for the particular communication network.

The memory 130 may further store instructions which, when executed by the processing system, causes the processing to perform tasks, processes or functions, as is well established in the field of electronic devices.

The processing system 140 may be communicatively coupled to each other element of the electronic device 100.

The processing system 140 is configured to execute one or more applications configured to communicate using the communication system. Thus, the processing system is configured to host or execute one or more pieces of application software or one or more application programs (which are alternative labels for an application). An application is considered distinct from an operating system (if present) which controls lower level functionality of the processing system. For instance, the application may comprise an executable program that is run within, on or using the operating system.

Throughout this disclosure, the term "application" could be replaced by any one of the following terms "piece of application software"; "piece of software"; "application program" or "program".

Any herein disclosed application may be embodied as a piece of non-transitory computer readable medium (e.g., stored in the memory 130) that, when run/executed/hosted by a processing system, functions as an application to perform the identified functions of the application.

Examples of applications that may be executed by the processing system include sensing applications. A sensing application may be configured to use a sensing system 150 of the electronic device 100 to obtain sensor data, e.g., comprising one or more sense values. The sensing application may be designed to then send the sensed value(s) to an external device or server (i.e., an application server) using the communication network(s).

Thus, the electronic device 100 may further comprise a sensing system 150. The sensing system may be configured to obtain sensor data, e.g., data responsive to an external stimulus/stimuli. Examples of suitable sensing systems include a camera (for obtaining image/video data), water monitoring apparatus (e.g., for sensing an amount of water used), electricity monitoring apparatus (for monitoring an amount of electricity used) and so on.

Thus, the one or more applications may comprise at least a sensing application configured to receive sensor data generated by the sensing system 150. The sensing application may be configured to control or define the transmission of the sensor data to a first external device, which can be labelled an application server.

The processing system 140 is also configured to execute or host a network monitoring application (NMA), which is configured to monitor, measure and calculate as dynamic values, the value of one or more dynamic properties for each of the plurality of different communication networks. An alternative label for the network monitoring application is a "connectivity application". Alternatively, the network monitoring application may form part of a (larger) connectivity application that is configured to control, monitor and/or determine connectivity information and/or functionality of the electronic device.

In other words, the network monitoring application is configured to monitor information about each communication network. This monitored information (the dynamic values) is information that is monitorable, detectable or derivable at the electronic device. Examples include any property or characteristic (of each communication network) that is expected to change over time (e.g., for different locations of the electronic device). Thus, an alternative label for the dynamic properties is "device-monitorable properties" or "measurable properties".

Suitable examples of dynamic properties for a communication network include: an availability (e.g., indicating whether or not communications can be sent over the communication network); a signal strength; a radio access technology; a bandwidth; an end-to-end throughput (e.g., to/from a target end server); a latency (e.g., to from a target end server); and/or a power consumption.

Approaches for determining the value or measure of such dynamic properties are well known in the art. For instance, one example of a value of signal strength is an RSSI. One example approach for determining a latency is to monitor a length of time for an end server to respond to a timestamped communication. One approach for monitoring a power consumption is to monitor an average power consumed by the communication system 110 during a communication period. Another approach for monitoring or measuring one or more dynamic properties is to make use of known end-to-end protocols, such as MQTT, to observe and calculate one or more dynamic values such as availability, throughput, and so on. A wide variety of other techniques will be readily apparent to the skilled person.

In some examples, the network monitoring application is configured to monitor communications performed by the one or more applications that communicate using the communication system, e.g., by monitoring responses to such communications to determine or otherwise derive the dynamic value(s), e.g., an RSSI of responses, a latency of such responses and so on. Thus, in practice, the one or more applications may communicate using the communication system via the network monitoring application.

In general, the network monitoring application may co-ordinate with the communication system 110 to monitor or measure, as dynamic values, the value of one or more dynamic properties for each of the plurality of different communication networks. Of course, the network monitoring application may co-ordinate with other modules of the electronic device, depending upon the dynamic property/properties that undergo monitoring—e.g., the network monitoring application may co-ordinate with a power monitoring system to monitor an energy consumption.

In practice, the network monitoring application may be configured to select or determine over which communication network(s) the electronic device is able to communicate. This can be at least partially determined based on the monitored dynamic values of the plurality of different communication networks, e.g., to select a network having the greatest signal strength. Other rules or procedures for selecting an appropriate communication network will be apparent to the skilled person.

The processing system 140 of the electronic device 100 is also configured to host an application programming interface (API). In practice, the network monitoring application and the application programming interface may form different aspects of a same connectivity intelligence application hosted or executed by the processing system 140.

The API is configured to respond to an API request by providing one or more of the dynamic and/or static values. In particular, the API is configured to respond to a request from an application (executed by the processing system) for any such dynamic/static values by providing the dynamic/static values. In this way, the API makes the dynamic/static values available to the one or more application(s).

The API may obtain the one or more dynamic and/or static values from the network monitoring application and/or the memory 130 (into which the NMA may store the relevant value(s)).

Each application that makes an API request (a "requesting application") to the API can be configured to adjust a function performed by the application responsive to the one or more of the dynamic values and/or static values. In particular, each application may modify or adjust how the application uses the communication networks to communicate.

Put another way, the functionality of the requesting application is at least partially dependent upon the one or more of the dynamic values and/or static values received responsive to an API request made by the requesting application.

It will be clear that the adjustment to the function of the application may be performed automatically by the application, e.g., without needing further input from a user or operator of the electronic device.

In one example, the requesting application may be configured to determine an amount and/or type of data to communicate (to a first external device such as an application server) using the communication system, responsive to the one or more dynamic values and/or static values provided by the application programming interface in response to the API request.

This provides one example of an approach in which the requesting one of the one or more applications is configured to adjust a data transfer function performed by the application using the communication system responsive to the one or more of the dynamic values and/or static values.

In this way, the requesting application may adapt the data transfer (amount or rate) responsive to properties of the communication network(s) over which it communicates. Thus, the communication from the (requesting) application to an end server that carries data may be responsive to the property of the communication network over which it communicates.

As a working example, if a bandwidth of a communication network (over which the electronic device communicates) reduces, e.g., due to a change of network, the requesting application may identify this change and reduce an amount of data sent over the communication network. As another example, if a static value indicates that the security level of the communication network fails to meet a certain threshold, the requesting application may prevent or restrict the (type of) data sent over the communication network, e.g., to data that can be sent over an unsecured channel or to only encrypted data. As yet another example, if a particular network becomes unavailable, the requesting application may prevent (certain) data from being sent over any remaining available network(s).

As another example, if a cost of sending data over a communication network (over which the electronic device communicates) increases, e.g., due to a change of network, the requesting application may identify this change and reduce an amount of data sent over the communication network.

As another example, if a latency of sending data over a communication network (over which the electronic device communicates) increases, e.g., due to a change of network, the requesting application may identify this change and reduce an amount of data sent over the communication network.

As yet another example, the requesting application may control a type and/or amount of data responsive to the property/properties of a communication network that is used by the electronic device to communicate with the end server (to which the data is to be sent). The selection of the communication network may be performed independently of the application configured to send the data, such that the application changes its function based on the communication network in use.

Consider a scenario in which the processing system runs or executes a fleet tracking application (e.g., for use in a car, van, truck or other automobile). The fleet tracking application may be configured to monitor or receive sensor information/data about the automobile or captured from one or more sensor devices (i.e., a sensor system) of the automobile. Examples of suitable sensor data for this embodiment include e.g., engine (performance) data, OBD-II data, video data from an onboard camera or dash cam, telematics data produced by a telematics unit and so on. The fleet tracking application may wish to send captured information (i.e., the sensor data) to an external server, e.g., responsive to a detected accident/fault or for the purposes of ongoing monitoring.

In such a scenario, the fleet tracking application may be configured to request, via an API request, an availability and (optionally, e.g., if not known) a radio access technology for each communication network that is available to the fleet tracking application, which may be only a single communication network. Responsive to only a high-cost 3GPP R.17 NTN satellite network being available, the fleet tracking information may choose to send data only responsive to a critical event such as an accident or engine failure. Responsive to a mid-cost terrestrial cellular connection being available, the fleet tracking application may choose to periodically send engine performance data and frames/pictures from video data. Responsive to a Wi-Fi and/or internet broadband connection being available, the fleet tracking application may choose to send all available video data and engine (performance) data.

In this way, the fleet tracking application adjusts or modifies its performance and/or functions performed responsive to the changing availability of different networks.

As another example, the requesting application may be configured to determine a priority of data transfer (i.e., an order in which to send data), responsive to the one or more dynamic values and/or static values provided by the application programming interface in response to the API request.

As an example, the requesting application may be configured to queue data for transfer over the communication network(s). The order of data in the queue may be determined responsive to a bandwidth or data transfer rate of the (available) communication network(s), e.g., to prioritize the transmission of more urgent information over less urgent information.

A wide variety of other approaches, reasons and logic for controlling data transfer over one or more communication network(s) responsive to any obtained dynamic and/or static values will be readily apparent to the skilled person.

The API may be configured to respond to the API request by providing the one or more of the dynamic values and/or static values of only the active communication network(s) to the application. In this context, the active communication network(s) may comprise only the communication network(s) over which the requesting application is able to communicate, e.g., transfer data to an end server. The selection of the active communication network(s) may, for instance, be performed independently of the operation of the application—e.g., by the network monitoring application—although this is not essential. This approach allows the application to adapt its functionality responsive to the communication network over which the application is to communicate.

In some examples, the API may be configured to respond to the API request by providing the one or more of the dynamic values and/or static values of two or more communication networks, e.g., each communication network monitored by the network monitoring system.

In some examples, the requesting application may be configured to select a communication network, over which to communicate using the communication system, responsive to the one or more dynamic values and/or static values provided by the application programming interface in response to the API request. Thus, in this approach, the application programming interface may be configured to respond to the API request by providing one or more of the dynamic values and/or static values for two or more communication networks to the requesting application.

Such an approach differs from existing or known techniques in that the application itself makes a decision over which communication network to communicate, e.g., rather than being decided by an operating system or the like (i.e., independently of the application).

In this way, the requesting application is able to itself choose or select over which (available) communication network it is to communicate. In other words, the requesting application performs the decision making process for communication networks. More specifically, the requesting application may make a decision as to which of two or more available communication networks is used for communication based on the dynamic and/or static value(s) requested by the application.

As previously indicated, it is not essential that the application make the decision as to which communication network is used. Rather, this may be determined by a separate application or procedure, e.g., based on a predetermined priority list or order. For instance, the network monitoring application may be configured to perform the selection of the communication network(s) to use.

The preceding examples explain approaches in which the application(s) executed by the processing system are configured to respond to information provided in response to their API request(s).

In further examples, the application programming interface is configured to, responsive to a change in a dynamic value beyond a predetermined threshold, asynchronously provide an indicator of change to at least one of the one or more applications executed by the processing system. In this way, the API is able to preemptively update an application executed by the processing system without specifically needing an API request. This can be performed, for instance, if a sudden change in the monitored dynamic value(s) takes place. Appropriate functions for asynchronously providing data to an application are known in the art, such as those that employ an async or callback function. Asynchronously providing data to an application may, for instance, be considered a push of the data from the API to the application.

The value of the predetermined threshold may be different for each dynamic value, and may depend upon the exact nature and scale (i.e., potential range) of the dynamic value. As a working example, the predetermined threshold may be a predetermined percentage of a previous value for the dynamic value (e.g., a greatest or smallest value within a predetermined previous window of time, e.g., a preceding day or preceding hour).

There are a wide variety of actions or tasks that may be performed by an application responsive to receiving any indicator of change. In one example, such applications are considered to send an API request to the API responsive to receiving the indicator of change. As another example (e.g., if the indicator of change identifies a total change), the application may make use of the indicated change to modify or adjust its functionality using any previously described approach.

Preferably, at least one of the one or more applications executed by the processing system (to which the API sends any indicator of change) comprises (e.g., only) any/each application that previously sent an API request to the application programming interface. In this way, information may only be sent to the application(s) which are expected to make use of the indicator of change to advantage.

The processing system of the electronic device may be configured to, when hosting the application programming interface, communicate with a second external device (which can be labelled a connectivity management platform), using the communication system, to update the static values. If the application making the API request is configured to send data to a first external device (e.g., an application server), the second external device or connectivity management platform that updates the static value(s) and the first external device or application server (to which the application sends data) may be different.

In particular, the connectivity management platform may send update information to the electronic device, via the communication system of the electronic device. The processing system may receive the update information and update the static values stored in the memory responsive to the update information. The update information thereby carries or contains information usable to update or change the static values stored in the memory. This provides a mechanism for updating the static values.

The network monitoring application may be the application configured to communicate with the connectivity management platform to receive the update information. In this way, the network monitoring application may be responsible for updating the static value(s) stored in the memory 130 responsive to (any) update information received from the connectivity management platform.

The communication with the connectivity management platform may be periodic, e.g., to periodically update the static values. Alternatively, the communication with the connectivity management platform may be triggered by the external device, e.g., to respond to changes in the static properties-such as those resulting from changes in perceived security or cost of the communication network(s).

In some examples, the electronic device comprises an input user interface communicatively coupled to the processing system. The input user interface may be configured to receive input data from the input user interface that identifies one or more changes to the static values. The processing system may receive the input data and update the static values responsive thereto. This provides a mechanism for updating the static values responsive to a user input. This can allow, for instance, a user or operator to modify the static properties (e.g., in response to a press release about the communication network(s) or a personal preference for the communication network(s))

The processing system of the electronic device may be further configured to receive one or more rules or processing instructions from a third external device, which may be the same as the second external device (e.g., the connectivity management platform). In some examples, the same external device provides both the one or more rules or processing instructions and the update information.

The one or more rules or processing instructions may be used by the network monitoring application, which is hosted by the processing system, to adjust or define selection criteria for selecting the one or more communication networks over which the electronic device is able to communicate. In this way, an external device may update the rule(s) used to select the communication network(s) over which the electronic device communicates, which selection may be performed by the network monitoring application.

In this way, the one or more rules or processing instructions may define how the electronic device selects the communication network(s) over which it communicates. The one or more rules or processing instructions may, for instance, define one or more thresholds for decision making by the network monitoring application.

It has previously been explained how, in some examples, the network monitoring application is configured to monitor communications performed by the one or more applications that communicate using the communication system. In practice, the one or more applications may communicate using the communication system via the network monitoring application and via the API.

Proposed embodiments make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media (e.g., the memory) such as volatile and non-volatile computer memory such as RAM, PROM, EPROM, and EEPROM. The storage media or memory may be encoded with one or more programs that, when executed on one or more processors and/or processing systems, perform the required functions. Thus, there is provided a computer program product comprising computer program code that, when executed on a computing device having a processing system, cause the processing system to perform all of the steps of any herein described method. The computer program may be stored on a non-transitory computer readable medium. Various storage media may be fixed within a processor or processing system or may be transportable, such that the one or more programs stored thereon can be loaded into a processor or processing system.

Of course, the electronic device may comprise other components and modules, which are not shown in FIG. 2 for the sake of illustrative clarity. Examples of other suitable elements for the electronic device include a further sensing system (e.g., a thermometer, a water sensing system, a camera and so on), an input user interface (e.g., a touch-sensitive screen, a keyboard, a mouse and so on); and/or an output user interface (e.g., a screen/display, a speaker and so on).

Figure 3:
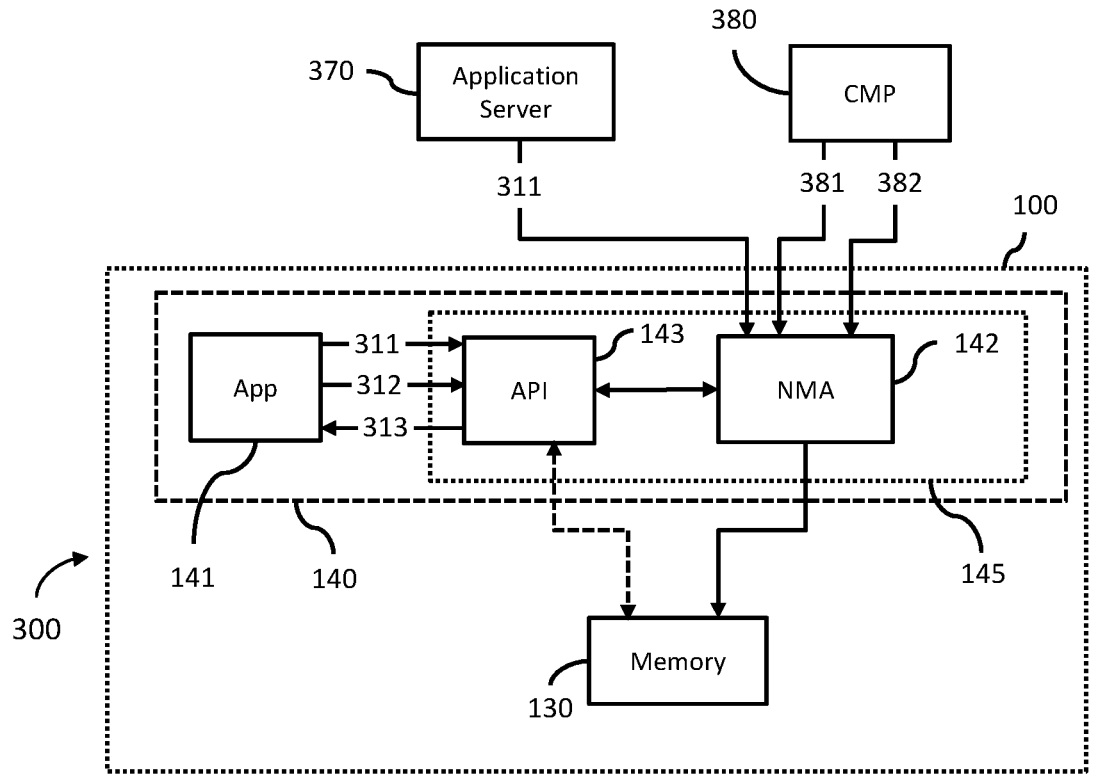
FIG. 3 conceptually illustrates elements of a proposed system.

FIG. 3 illustrates the communication between different conceptual elements of a proposed system 300.

FIG. 3 illustrates the electronic device 100 having the memory 130 and the processing system 140. The communication system of the electronic device 100 is not directly illustrated in FIG. 3, although it will be clear that communications from the electronic device 100 to any external device 370, 380 take place using the communication system over one or more communication networks.

The memory 130 is configured to store, as static values, the value of one or more static properties for each of a plurality of different communication networks.

As previously explained, the processing system 140 is configured to run, execute or host one of more applications 141 or "apps", the network monitoring application 142 and the application programming interface (API) 143. In particular, the processing system 140 may run an operating system, within/on which the one of more applications 141, the network monitoring application 142 and the application programming interface (API) 143 run. In practice, the network monitoring application 142 and the application programming interface 143 may form different aspects of a same connectivity intelligence application 145.

The network monitoring application 142 is configured to monitor, as dynamic values, the value of one or more dynamic properties for each of the plurality of different communication networks.

The application 141 may be configured to communicate with an application server 370, e.g., using a communication system (not illustrated in FIG. 3) of the electronic device. In particular, the application 141 may be configured to transfer data 311 to the application server 370, e.g., in a data transfer communication. The application server 370 is one example of an end server or an external device to the electronic device 100.

The communication between the application 141 and the application server may be performed via the API 143 and the network monitoring application (NMA) 142. This allows, for instance, the network monitoring application to monitor the dynamic value(s) by monitoring the communication between the application and the application server 370 over the communication channel. In this way, the data 311 to be transferred to the application server 370 may be performed via the API 143 and NMA 142.

As a working example, the application 141 may be a sensing application configured to obtain sensor data from one or more sensor devices (not illustrated in FIG. 3) of the electronic device 100. The sensor application 141 may send some or all of the sensor data to the application server 370.

The application 141 is configured to make an API request 312 to the application programming interface 143. The API request is a request for one or more dynamic values and/or static values for each communication network over which the electronic device is able to communicate. The API responds to the API request with the requested value(s), e.g., in an API request response 313. In this way, the API 143 makes the dynamic value(s) and the static value(s) available to the application 141.

The API 143 may be configured to communicate, co-ordinate or liaise with the network monitoring application 142 and/or the memory 130 to obtain the value(s) to be made available to the application 141.

The application 141 is configured to adjust or modify its function responsive to the requested value(s) of the dynamic and/or static value(s). In particular examples, the application 141 may be configured to control or define what type and/or an amount of data to transfer to the application server 370. Approaches for controlling this data transfer function have been previously described and exemplified.

For instance, if the application 141 is a sensing application, then the sensing application 141 may be configured to control an amount of data (sent to the application server 370) responsive to the static/dynamic properties of the available communication network.

The system 300 may further comprise a connectivity management platform 380 (CMP), which is another example of an external device to the electronic device 100. An alternative label for the CMP is a management platform server (MPS).

The connectivity management platform 380 may be configured to send update information 381 to the electronic device 100, via the communication system of the electronic device. The processing system 140 may receive the update information and update the static values stored in the memory 130 responsive to the update information. In particular, the network monitoring application 142 may be configured to receive the update information and update the static values stored in the memory. Thus, the connectivity management platform 380 may be configured to send update information to the network monitoring application 142, via the communication system of the electronic device. The update information thereby carries or contains information usable to update or change the static values stored in the memory. This provides a mechanism for updating the static values.

The connectivity management platform 380 (or another external device) may be configured to send one or more rules or processing instructions 382 to the application 141.

The one or more rules or processing instructions 382 may be used by the network monitoring application 142, which is hosted by the processing system 140, to adjust or define selection criteria for selecting the one or more communication networks over which the electronic device 100 is able to communicate. In this way, the connectivity management platform 380 may update the rule(s) used to select the communication network(s) over which the electronic device communicates, which selection may be performed by the network monitoring application.

In this way, the one or more rules or processing instructions may define how the electronic device selects the communication network(s) over which it communicates. The one or more rules or processing instructions may, for instance, define one or more thresholds for decision making by the network monitoring application.

In this way, the connectivity management platform 380 may update the functionality of the connectivity intelligence application 145.

Figure 4:
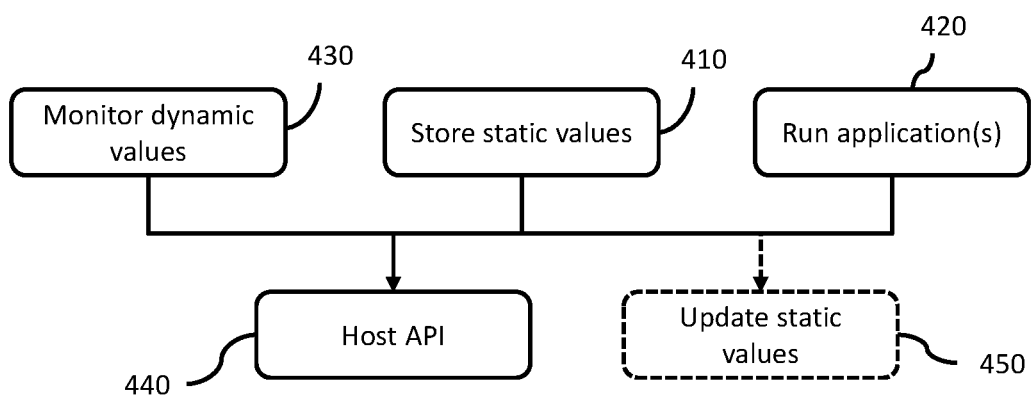
FIG. 4 illustrates a proposed method.

FIG. 4 is a flowchart illustrating a proposed method 400. The method is performed using an electronic device, such as that previously disclosed.

More particularly, the electronic device comprises a memory; a processing system and a communication system configured to facilitate communication externally to the electronic device over a plurality of different communication networks.

The method 400 comprises a step 410 of storing, in the memory configured, as static values, the value of one or more static properties for each of the plurality of different communication networks. The one or more static properties may include: a security level; a reliability; a level of compliance; and/or a network cost.

The method 400 also comprises a step 420 of executing, on the processing system, one or more applications configured to communicate using the communication system.

The method 400 also comprises a step 430 of hosting, on the processing system, a network monitoring application configured to monitor, as dynamic values, the value of one or more dynamic properties for each of the plurality of different communication networks. The one or more dynamic properties may include one or more of the following: an availability; a signal strength; a radio access technology; a bandwidth; an end-to-end throughput; a latency; and/or a power consumption.

The method 400 also comprises a step 440 of hosting, on the processing system, an application programming interface configured to respond to an API request, from a requesting one of the one or more applications, by providing one or more of the dynamic values and/or static values to the requesting application.

In some examples, the method 400 also comprises a step 450 of, when hosting the application programming interface, communicating with an external device, using the communication system, to update the static values.

In some examples, the requesting application is configured to determine an amount and/or type of data to communicate using the communication system, responsive to the one or more dynamic values and/or static values provided by the application programming interface in response to the API request.

In some examples, the application programming interface is configured to respond to the API request by providing one or more of the dynamic values and/or static values for two or more communication networks to the requesting application; and the requesting application is configured to select a communication network, over which to communicate using the communication system, responsive to the one or more dynamic values and/or static values provided by the application programming interface in response to the API request.

The skilled person would be readily capable of developing a processing system for carrying out any herein described method. Thus, each step of the flow chart may represent a different action performed by a processing system, and may be performed by a respective module of the processing system. The processing system may be embodied as previously disclosed.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

What is claimed is:

1. An electronic device comprising:
a communication system configured to facilitate communication externally to the electronic device over a plurality of different communication networks;
a memory configured to store, as static values, the value of one or more static properties for each of the plurality of different communication networks;
a processing system configured to:
execute one or more applications configured to communicate using the communication system;
host a network monitoring application configured to monitor, as dynamic values, the value of one or more dynamic properties for each of the plurality of different communication networks; and
host an application programming interface configured to respond to an API request, from a requesting one of the one or more applications, by providing one or more of the dynamic values and/or static values to the requesting application,
wherein the requesting one of the one or more applications is configured to adjust a function performed by the application responsive to the one or more of the dynamic values and/or static values.

2. The electronic device of claim 1, wherein the requesting one of the one or more applications is configured to adjust a data transfer function performed by the application using the communication system responsive to the one or more of the dynamic values and/or static values.

3. The electronic device of claim 1, wherein the processing system is configured to, when hosting the application programming interface, communicate with an external device, using the communication system, to update the static values.

4. The electronic device of claim 1, wherein the one or more dynamic properties include one or more of the following: an availability; a signal strength; a radio access technology; a bandwidth; an end-to-end throughput; a latency; and/or a power consumption.

5. The electronic device of claim 1, wherein the one or more static properties include: a security level; a reliability; a level of compliance; and/or a network cost.

6. The electronic device of claim 1, wherein the application programming interface is configured to, responsive to a change in a dynamic value beyond a predetermined threshold, asynchronously provide an indicator of change to at least one of the one or more applications executed by the processing system.

7. The electronic device of claim 6, wherein the at least one of the one or more applications executed by the processing system comprises any application that previously sent an API request to the application programming interface.

8. The electronic device of claim 1, wherein the processing system is further configured to send, using the communication system, the dynamic values to one or more external devices.

9. The electronic device of claim 1, wherein the requesting application is configured to determine an amount of data to communicate using the communication system, responsive to the one or more dynamic values and/or static values provided by the application programming interface in response to the API request.

10. The electronic device of claim 1, wherein:
the application programming interface is configured to respond to the API request by providing one or more of the dynamic values and/or static values for two or more communication networks to the requesting application; and
the requesting application is configured to select a communication network, over which to communicate using the communication system, responsive to the one or more dynamic values and/or static values provided by the application programming interface in response to the API request.

11. A method for using an electronic device, wherein the electronic device comprises a memory; a processing system and a communication system configured to facilitate communication externally to the electronic device over a plurality of different communication networks, wherein the method comprises:
storing, in the memory, as static values, the value of one or more static properties for each of the plurality of different communication networks;
executing, on the processing system, one or more applications configured to communicate using the communication system;
hosting, on the processing system, a network monitoring application configured to monitor, as dynamic values, the value of one or more dynamic properties for each of the plurality of different communication networks; and
hosting, on the processing system, an application programming interface configured to respond to an API request, from a requesting one of the one or more applications, by providing one or more of the dynamic values and/or static values to the requesting application,
wherein the requesting one of the one or more applications is configured to adjust a function performed by the application responsive to the one or more of the dynamic values and/or static values.

12. The method of claim 11, further comprising, when hosting the application programming interface, communicating with an external device, using the communication system, to update the static values.

13. The method of claim 11, wherein:
the one or more dynamic properties include one or more of the following: an availability; a signal strength; a radio access technology; a bandwidth; an end-to-end throughput; a latency; and/or a power consumption; and/or
the one or more static properties include: a security level; a reliability; a level of compliance; and/or a network cost.

14. The method of claim 11, wherein the requesting application is configured to determine an amount of data to communicate using the communication system, responsive to the one or more dynamic values and/or static values provided by the application programming interface in response to the API request.

15. A computer-readable medium comprising instructions which, when executed by a processing system, cause the processing system to perform operations comprising:
storing, in a memory, as static values, the value of one or more static properties for each of a plurality of different communication networks;
executing, on the processing system, one or more applications configured to communicate using a communication system;
hosting, on the processing system, a network monitoring application configured to monitor, as dynamic values, the value of one or more dynamic properties for each of the plurality of different communication networks; and
hosting, on the processing system, an application programming interface configured to respond to an API request, from a requesting one of the one or more applications, by providing one or more of the dynamic values and/or static values to the requesting application,
wherein the requesting one of the one or more applications is configured to adjust a function performed by the application responsive to the one or more of the dynamic values and/or static values.

16. The computer-readable medium of claim 15 comprising additional instructions which, when executed by the processing system, cause the processing system to perform operations further comprising:
when hosting the application programming interface, communicating with an external device, using the communication system, to update the static values.

17. The computer-readable medium of claim 15
wherein the one or more dynamic properties include one or more of the following: an availability, a signal strength, a radio access technology, a bandwidth, an end-to-end throughput, a latency, and/or a power consumption; and/or
wherein the one or more static properties include a security level, a reliability, a level of compliance, and/or a network cost.

18. The computer-readable medium of claim 15, wherein the requesting application is configured to determine an amount of data to communicate using the communication system, responsive to the one or more dynamic values and/or static values provided by the application programming interface in response to the API request.

* * * * *